US010404973B2

United States Patent
Tonar et al.

(10) Patent No.: US 10,404,973 B2
(45) Date of Patent: Sep. 3, 2019

(54) FOCAL DISTANCE CORRECTING VEHICLE DISPLAY

(71) Applicant: Gentex Corporation, Zeeland, MI (US)

(72) Inventors: William L. Tonar, Holland, MI (US); Andre J. Rieder, Zeeland, MI (US)

(73) Assignee: GENTEX CORPORATION, Zeeland, MI (US)

( * ) Notice: Subject to any disclaimer, the term of this patent is extended or adjusted under 35 U.S.C. 154(b) by 61 days.

(21) Appl. No.: 15/486,908

(22) Filed: Apr. 13, 2017

(65) Prior Publication Data

US 2017/0302913 A1  Oct. 19, 2017

Related U.S. Application Data

(60) Provisional application No. 62/322,325, filed on Apr. 14, 2016.

(51) Int. Cl.
*H04N 7/18* (2006.01)
*H04N 13/327* (2018.01)
(Continued)

(52) U.S. Cl.
CPC .......... *H04N 13/327* (2018.05); *B60K 35/00* (2013.01); *B60R 1/00* (2013.01); *G06K 9/00335* (2013.01);
(Continued)

(58) Field of Classification Search
CPC .. H04N 13/327; H04N 13/366; H04N 13/243; H04N 13/31; H04N 13/383;
(Continued)

(56) References Cited

U.S. PATENT DOCUMENTS 6,377,295 B1   4/2002   Woodgate et al.
6,501,536 B1   12/2002  Fredricks
(Continued)

FOREIGN PATENT DOCUMENTS

DE   102005001973 A1   7/2006
DE   102014205519 A1   10/2015
WO      2015168464 A1   11/2015

OTHER PUBLICATIONS

International Search Report and Written Opinion of the International Searching Authority, or the Declaration, dated Aug. 14, 2017, for International Application No. PCT/US2017/027413, filed Apr. 13, 2017, 9 pages.
(Continued)

*Primary Examiner* — Shan E Elahi
(74) *Attorney, Agent, or Firm* — Price Heneveld LLP; Bradley D. Johnson

(57) ABSTRACT

The disclosure provides for a display system for a vehicle comprising at least one image sensor, an image processor, and a display apparatus. The image sensor is configured to capture image data. The image processor is in communication with the image sensor and configured to generate augmented image data from the image data. The augmented image data is configured counteract a farsightedness of an occupant of the vehicle. The display apparatus is in communication with the image processor and configured to communicate the augmented image data independently to each of a right eye and a left eye of the occupant.

20 Claims, 6 Drawing Sheets

(51) Int. Cl.
| | |
|---|---|
| *H04N 13/305* | (2018.01) |
| *H04N 13/383* | (2018.01) |
| *H04N 13/398* | (2018.01) |
| *B60K 35/00* | (2006.01) |
| *B60R 1/00* | (2006.01) |
| *G06K 9/00* | (2006.01) |
| *H04N 13/31* | (2018.01) |
| *H04N 13/243* | (2018.01) |
| *H04N 13/366* | (2018.01) |
| *G06F 3/048* | (2013.01) |

(52) U.S. Cl.
CPC ..... *G06K 9/00604* (2013.01); *G06K 9/00671* (2013.01); *H04N 7/181* (2013.01); *H04N 13/243* (2018.05); *H04N 13/305* (2018.05); *H04N 13/31* (2018.05); *H04N 13/366* (2018.05); *H04N 13/383* (2018.05); *H04N 13/398* (2018.05); *B60K 2350/2013* (2013.01); *B60K 2350/2065* (2013.01); *B60K 2350/90* (2013.01); *B60R 2300/105* (2013.01); *B60R 2300/20* (2013.01); *B60R 2300/30* (2013.01); *G06F 3/048* (2013.01)

(58) Field of Classification Search
CPC .... H04N 13/398; H04N 7/181; H04N 13/305; G06K 9/00604; G06K 9/00335; G06K 9/00671; G06F 3/048; B60K 2350/90; B60K 2350/2065; B60K 35/00; B60K 2350/2013; B60R 2300/105; B60R 2300/20; B60R 2300/30; B60R 1/00
USPC ........................................................ 348/115
See application file for complete search history.

(56) References Cited

U.S. PATENT DOCUMENTS

| | | | |
|---|---|---|---|
| 6,572,233 B1 | 6/2003 | Northman et al. | |
| 8,237,909 B2 | 8/2012 | Ostreko et al. | |
| 8,339,526 B2 | 12/2012 | Minikey, Jr. et al. | |
| 8,411,245 B2 | 4/2013 | Lee et al. | |
| 8,947,605 B2 | 2/2015 | Eichenlaub | |
| 9,179,134 B2 | 11/2015 | Ranieri et al. | |
| 2006/0132914 A1* | 6/2006 | Weiss | G02B 5/32 |
| | | | 359/462 |
| 2007/0008620 A1 | 1/2007 | Shestak et al. | |
| 2007/0035694 A1* | 2/2007 | Keller | G02C 7/12 |
| | | | 351/159.6 |
| 2008/0068520 A1* | 3/2008 | Minikey, Jr. | B60R 1/12 |
| | | | 349/11 |
| 2008/0161997 A1* | 7/2008 | Wengelnik | B60K 35/00 |
| | | | 701/36 |
| 2009/0002394 A1* | 1/2009 | Chen | G06T 3/0062 |
| | | | 345/632 |
| 2009/0096937 A1* | 4/2009 | Bauer | B60R 1/12 |
| | | | 348/739 |
| 2009/0282429 A1 | 11/2009 | Olsson et al. | |
| 2010/0149317 A1 | 6/2010 | Matthews | |
| 2010/0201816 A1 | 8/2010 | Lee et al. | |
| 2011/0228211 A1* | 9/2011 | Waters | G02C 11/04 |
| | | | 351/158 |
| 2012/0092329 A1* | 4/2012 | Koo | G06K 9/3258 |
| | | | 345/419 |
| 2012/0229367 A1* | 9/2012 | Magyari | G02B 27/0172 |
| | | | 345/8 |
| 2013/0033593 A1* | 2/2013 | Chinnock | A61B 3/14 |
| | | | 348/78 |
| 2013/0113786 A1 | 5/2013 | King | |
| 2013/0127608 A1 | 5/2013 | Ishikawa et al. | |
| 2013/0342913 A1 | 12/2013 | Tsimhoni et al. | |
| 2014/0111854 A1* | 4/2014 | Kroon | G02B 27/2214 |
| | | | 359/463 |
| 2014/0125783 A1 | 5/2014 | Chung et al. | |
| 2014/0320656 A1 | 10/2014 | Foley | |
| 2014/0327771 A1 | 11/2014 | Malachowsky et al. | |
| 2015/0077826 A1* | 3/2015 | Beckman | G02B 27/01 |
| | | | 359/238 |
| 2015/0232030 A1* | 8/2015 | Bongwald | B60R 1/00 |
| | | | 348/115 |
| 2015/0235409 A1* | 8/2015 | Grossman | G06F 3/048 |
| | | | 345/421 |
| 2015/0245017 A1* | 8/2015 | Di Censo | G02B 27/0101 |
| | | | 348/51 |
| 2015/0283902 A1* | 10/2015 | Tuukkanen | B60K 35/00 |
| | | | 340/461 |
| 2015/0319423 A1 | 11/2015 | Kim et al. | |
| 2015/0334379 A1 | 11/2015 | Du et al. | |
| 2016/0042501 A1 | 2/2016 | Huang et al. | |
| 2016/0182877 A1* | 6/2016 | Deluca | G06F 3/013 |
| | | | 348/53 |
| 2016/0209647 A1* | 7/2016 | Fursich | G02B 27/0093 |
| 2017/0078468 A1* | 3/2017 | Cho | G06F 1/1652 |

OTHER PUBLICATIONS

Huang, Fu-Chung et al., Eyeglasses-free Display: Towards Correcting Visual Aberrations with Computational Light Field Displays, Siggraph, 2014, pp. 1-12.
Pamplona, Vitor F. et al., "Tailored Displays to Compensate for Visual Aberrations," Siggraph, 2012, pp. 1-12.
Gotoda, "A Multilayer Display Augmented by Alternating Layers of Lenticular Sheets," Visual Communications and Image Processing, vol. 9011, Mar. 6, 2014 (8 pages).
Fu-Chung Huang et al., "Correcting for Optical Aberrations using Multilayer Displays," ACM Transactions on Graphics, vol. 31, No. 6, Nov. 1, 2012 (12 pages).

* cited by examiner

US 10,404,973 B2

FOCAL DISTANCE CORRECTING VEHICLE DISPLAY

CROSS REFERENCE TO RELATED APPLICATION

This application claims priority to and the benefit under 35 U.S.C. § 119(e) of U.S. Provisional Patent Application No. 62/322,325, filed on Apr. 14, 2016, entitled "VISION CORRECTING VEHICLE DISPLAY," the entire disclosure of which is hereby incorporated herein by reference.

TECHNOLOGICAL FIELD

The present invention generally relates to display devices for vehicles and more particularly to display devices configured to generate vision correcting image data for a vehicular display.

SUMMARY OF THE DISCLOSURE

According to one aspect of the present disclosure, the disclosure provides for a display system for a vehicle comprising at least one image sensor, an image processor, and a display apparatus. The image sensor is configured to capture image data. The image processor is in communication with the image sensor and configured to generate augmented image data from the image data. The augmented image data is configured counteract a farsightedness of an occupant of the vehicle. The display apparatus is in communication with the image processor and configured to communicate the augmented image data independently to each of a right eye and a left eye of the occupant.

According to another aspect of the disclosure, a vehicle display device is disclosed. The device comprises at least one image sensor configured to capture image data and a tracking sensor configured to identify a position of an occupant. An image processor is in communication with the image sensor and the tracking sensor. The image processor is configured to generate augmented image data from the image data. The augmented image data is configured to counteract a farsightedness of an occupant of the vehicle. The device further comprises a display apparatus in communication with the image processor. The display apparatus comprises an optic array configured to communicate the augmented image data independently to each of a right eye and a left eye of the occupant based on the position of the occupant.

According to yet another aspect of the disclosure, a vehicle display device is disclosed. The device comprises at least one image sensor configured to capture image data and a tracking sensor configured to identify a position of an occupant. An image processor is in communication with the image sensor and the tracking sensor. The image processor is configured to generate augmented image data from the image data. The augmented image data is configured to counteract a farsightedness of an occupant of the vehicle. The device further comprises a display apparatus in communication with the image processor. The display apparatus comprises a pixel array and a lenticular lens configured to communicate the augmented image data independently to a right eye of the occupant as right image data and a left eye of the occupant as left image data. The display is configured to selectively activate pixels of the pixel array aligned through the lenticular lens with the right eye and the left eye of the occupant respectively based on the position of the occupant.

These and other features, advantages, and objects of the present invention will be further understood and appreciated by those skilled in the art by reference to the following specification, claims, and appended drawings.

DETAILED DESCRIPTION

Figure 1:
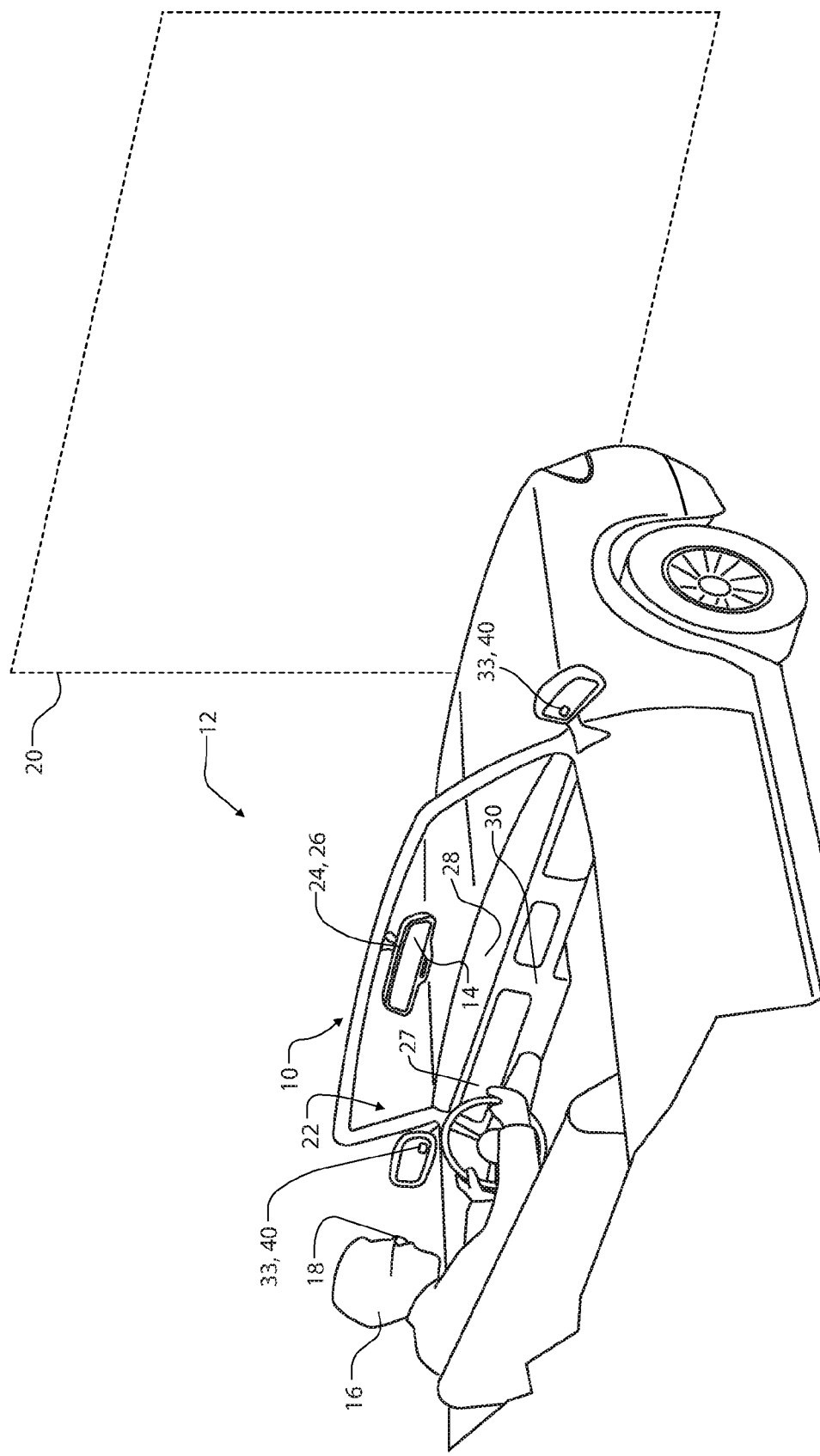
FIG. 1 is projected view demonstrating a display system of a vehicle.

For purposes of description herein, the terms "upper," "lower," "right," "left," "rear," "front," "vertical," "horizontal," and derivatives thereof shall relate to the invention as oriented in FIG. 1. Unless stated otherwise, the term "front" shall refer to the surface of the element closer to an intended viewer of a display, and the term "rear" shall refer to the surface of the element further from the intended viewer of the display. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises a . . . " does not, without more constraints, preclude the existence of additional identical elements in the process, method, article, or apparatus that comprises the element.

Referring to FIG. 1, the disclosure provides for a display system 10 for a vehicle 12. The display system 10 may be operable to display image data on a display screen 14. The image data may be augmented to revert or adjust for a vision correction of an occupant 16. The vision correction described herein may correspond to a variety of prescription enhancing devices and/or surgical procedures. Such devices may include but are not limited to corrective lenses, glasses, contact lenses, prosthetics, etc. Surgical procedures may include laser-assisted in situ keratomileusis (LASIK) and various surgical techniques. In some instances, the display system may also be operable to generate enhanced or augmented image data for occupants having farsightedness (hyperopia). Accordingly, the disclosed system may provide for the display of image data to the occupant 16 that corrects or counteracts negative effects related to observing image data at a close range on the display screen 14.

For example, as demonstrated in FIG. 1, the occupant 16 may wear corrective lenses 18 to correct for a number of vision conditions. Conditions that may be related to the use of corrective lenses 18 while operating the vehicle 12 may correspond to myopia (nearsightedness), astigmatism, keratoconus, presbyopia, etc. While the use of the corrective lenses 18 may improve the ability of the occupant 16 to identify far off objects in the distant region 20 relative the vehicle 12, the corrective lenses 18 may create challenges in seeing nearby objects in a passenger compartment 22 of the vehicle 12. Also, similar issues may exist for those having farsightedness. For example, one or more images shown on the display screen 14 of the display system 10 may appear blurred.

The difference in focal distance between the distant region 20 and nearby objects in the passenger compartment 22 may be more prevalent for older occupants 16 or operators of the vehicle 12. Due to a gradual loss of accommodation, older individuals may commonly have greater difficultly changing focus from the distant region 20 to the nearby objects. As discussed herein, nearby objects may correspond to objects within approximately 1 m from the occupant 16. The distant region 20 may correspond to distances greater than 2 m from the occupant 16. Accordingly, the occupant 16 may face challenges of eye strain as well as magnification correction when viewing nearby objects in the passenger compartment 22 while operating the vehicle 12.

The disclosure may provide for the display system 10 to generate and display augmented image data on the display screen 14. The augmented image data may be configured to be altered by the corrective lenses 18 of a particular occupant 16 such that reverted image data is transmitted to the occupant 16. The reverted image data may correspond to image data that appears to the occupant 16 as though the occupant was not wearing the corrective lenses 18. For example, the reverted image data may appear to a near sighted occupant as being in focus even though the occupant is viewing the reverted image data through the corrective lenses 18. In this way, the display system 10 may provide for the image data to be counter-corrected to adjust the image data to appear in focus to an occupant wearing corrective lenses.

Figure 3:
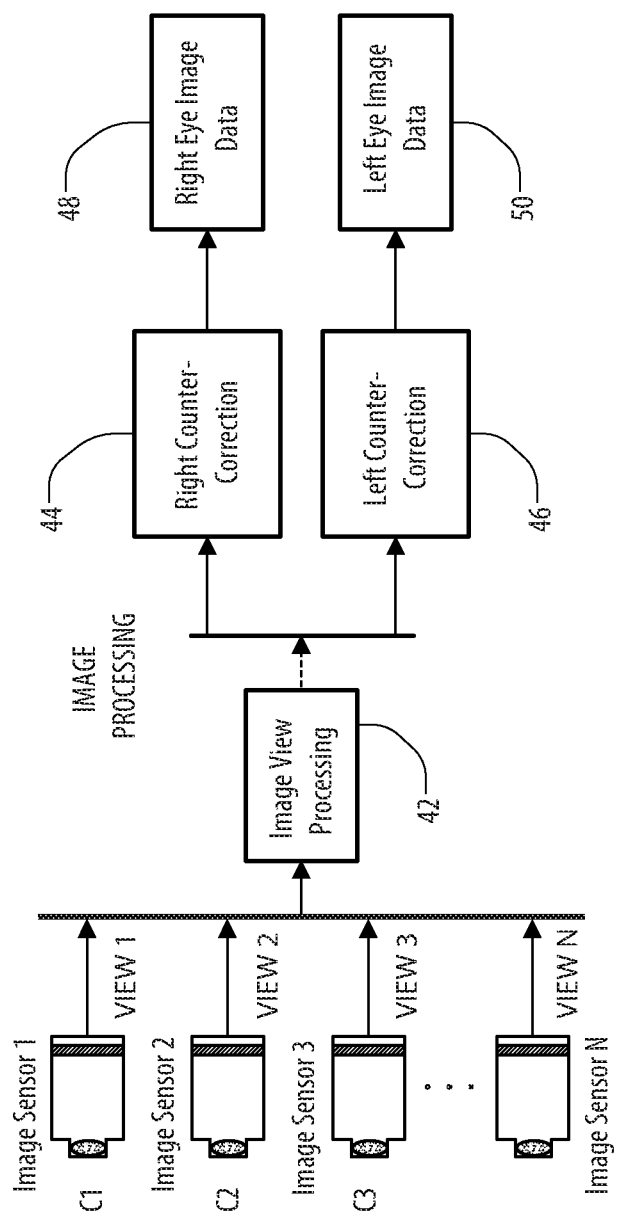
FIG. 3 is a block diagram of an image processing method for generating augmented image data.
Figure 4:
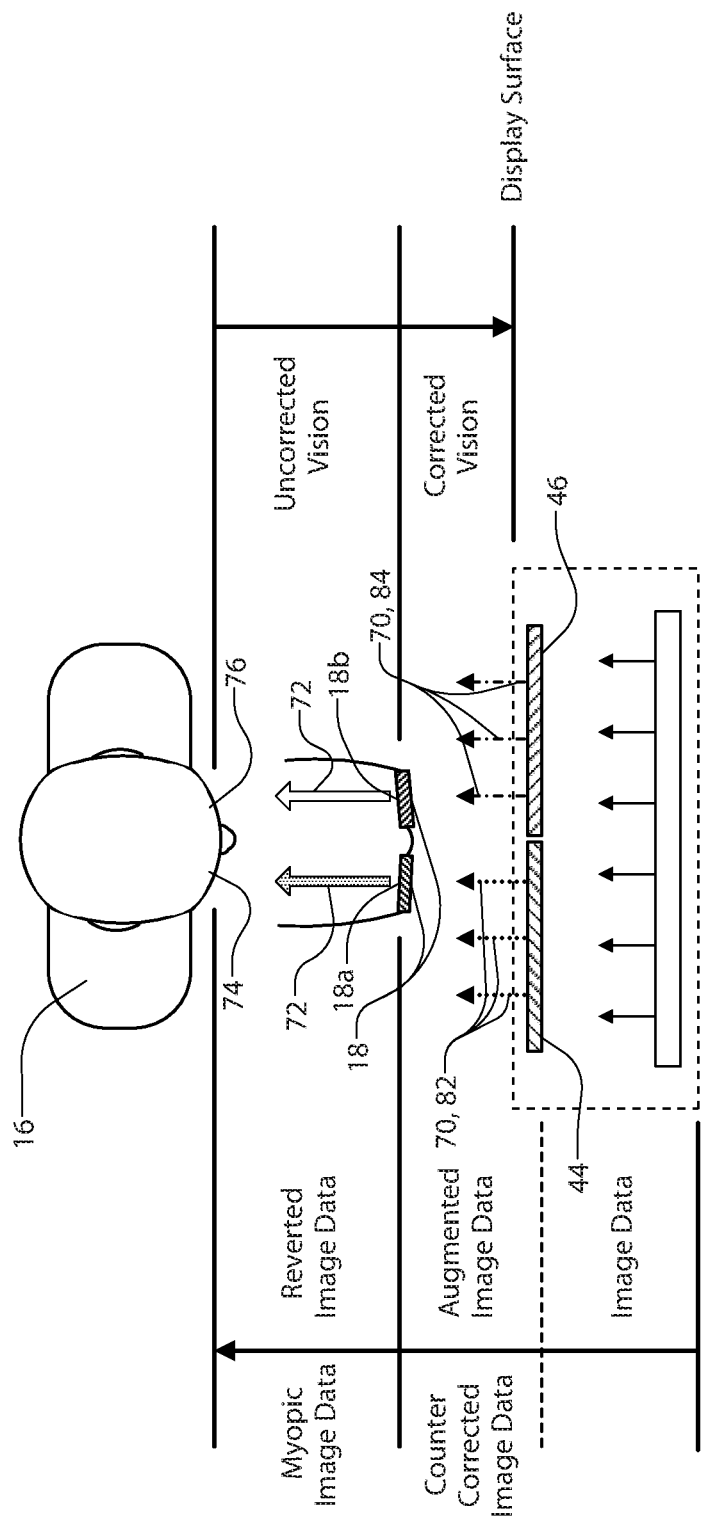
FIG. 4 is a schematic diagram of an image processing method for an occupant of a vehicle viewing reverted image data converted from augmented image data.
Figure 5:
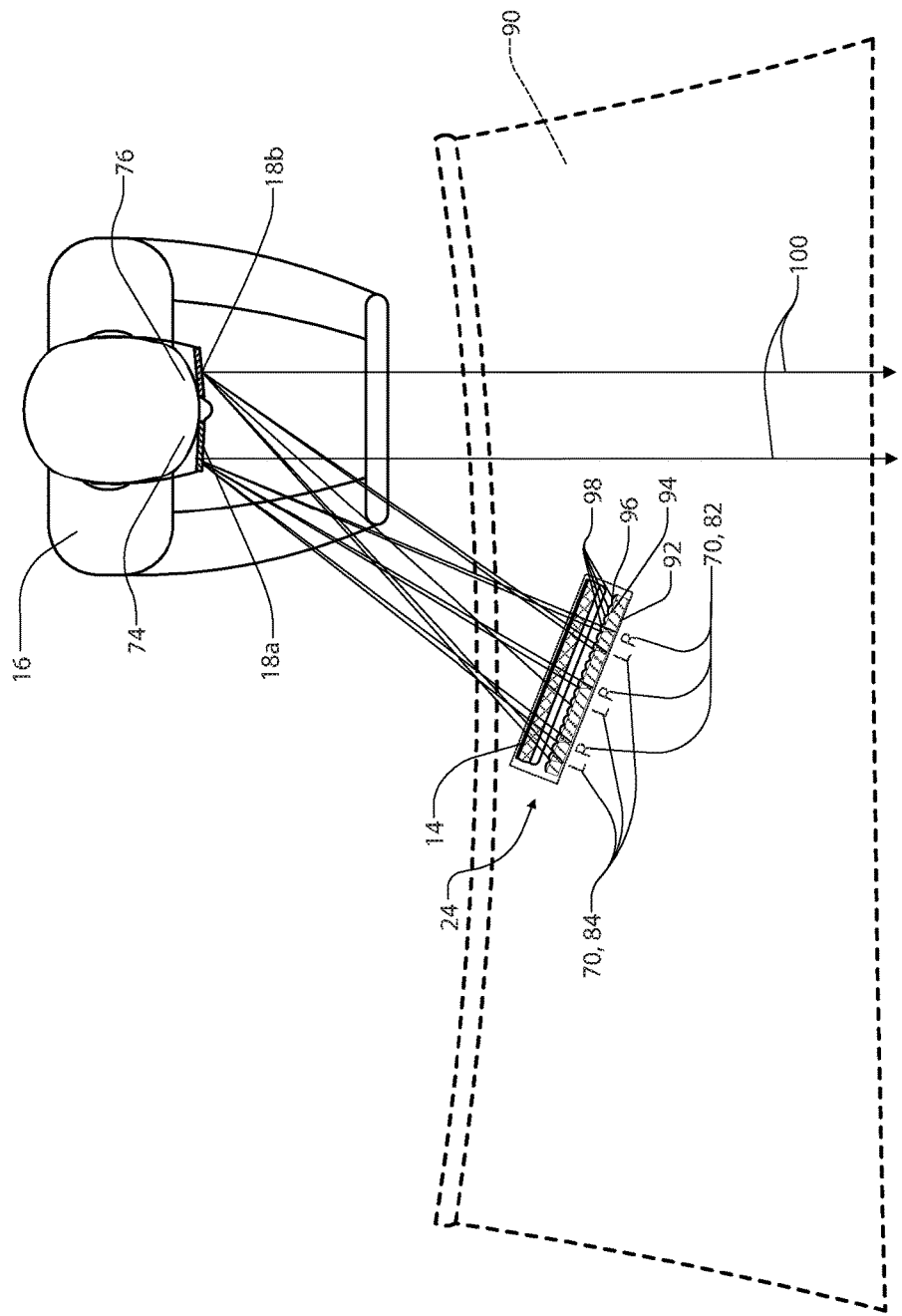
FIG. 5 is a top schematic view of a vehicle occupant viewing reverted image data converted from augmented image.

As discussed further in reference to FIGS. 3-5, the display system 10 may be configured to capture and display image data on the display screen 14. The image data may comprise image data in the form of right eye image data or frames and left eye image data or frames. The right eye image data may be transmitted from the display screen 14 such that it is received by the right eye of the occupant 16. The left eye image data may be transmitted from the display screen 14 such that it is received by the left eye of the occupant 16. Accordingly, the display screen 14 may form a portion of a display apparatus 24 configured to project specific frames of the image data to each of the left eye and the right eye of the occupant 16.

According to various embodiments, the display apparatus 24 may comprise similar features to an autostereoscopic or automultiscopic display. The following references may include various implementations for display systems and camera systems configured to provide for autostereoscopic and/or automultiscopic functionality and are incorporated herein by reference in their entirety: U.S. Pat. No. 9,179,134 B2, entitled "MULTI-LAYER PLENOPTIC DISPLAYS THAT COMBINE MULTIPLE EMISSIVE AND LIGHT MODULATING PLANES, filed Nov. 27, 2012, by Ranieri et al.; U.S. Publication No. 2015/0334379 A1, entitled "DISPLAY UNIT FOR ROTATABLY DISPLAYING AN AUTOSTEREOSCOPIC PRESENTATION," filed Dec. 24, 2012, by Lin Du et al; U.S. Pat. No. 6,377,295 B1, entitled "OBSERVER TRACKING DIRECTIONAL DISPLAY," filed Apr. 23, 2002, by Graham Woodgate, et al.; U.S. Pat. No. 9,843,776, entitled "MULTI-PERSPECTIVE STEREOSCOPY FROM LIGHT FIELDS," filed Jul. 15, 2015 by Changil Kim, et al.; U.S. Pat. No. 10,025,110, entitled "AUTOSTEREOSCOPIC IMAGE DISPLAY AND METHOD FOR DRIVING THE SAME," filed Nov. 6, 2013 by Bogyun Chung, et al.; U.S. Pat. No. 8,947,605 B2, entitled "IMAGE DATA PLACEMENT METHOD FOR A TIME MULTIPLEXED AUTOSTEREOSCOPIC DISPLAY," filed Sep. 13, 2012 by Jesse B. Eichenlaub; and U.S. Publication No. 2009/0282429 A1, entitled "VIEWER TRACKING FOR DISPLAYING THREE DIMENSIONAL VIEWS," filed May 7, 2008 by Stefan Olsson, et al.

As discussed herein, the display system 10 may be configured to generate separate images for the right eye and the left eye of the occupant 16. Additionally, the display system 10 may be configured to generate a plurality of views that may be associated with a plurality of image sensors. Embodiments of the display system 10 configured to provide for a plurality of views may utilize one or more stereoscopic display methods to communicate the image data to the left eye and the right eye independently. In this configuration, the display apparatus 24 may provide for views that may normally be shown on a rearview mirror and conventional side mirrors.

In some embodiments, the display apparatus may be configured to track the position of the occupant 16 in the passenger compartment 22. For example, the display apparatus 24 may comprise a sensor configured to track a location of a face and/or the eyes of the occupant 16. In this way, the display apparatus 24 may be operable to track a position of the eyes of the occupant 16 to control specific pixels in a pixel array configured to target the left eye or the right eye. The eyes of the operator may be tracked by one or more tracking sensors that may be incorporated in a display apparatus 24. The tracking sensor is discussed further in reference to FIG. 6.

In various embodiments, the display apparatus 24 may utilize parallax-based displays and/or integral imaging (lenticular sheets or fish-eye arrays). Such display technologies may be used to provide an autostereoscopic or automultiscopic experience for the occupant 16 or a view of the display screen 14. Parallax-based displays may incorporate a parallax barrier and/or employ horizontally modulated blocking patterns to communicate different frames of image data to the first eye and the second eye of the occupant 16. The parallax barrier may correspond to a device that may be placed in front of the display screen 14, such as a liquid crystal display (LCD) or other displays, to allow the display screen 14 to show or display a stereoscopic or 3D image without the need for the viewer to wear 3D glasses. The parallax barrier may include a layer of material with a series of precision slits that allow each eye of a viewer to see a different set of pixels.

The display system 10 may be configured to capture the image data corresponding to one or more cameras and generate augmented image data configured to be reverted as it is transformed through the corrective lenses 18. In this way, the display system 10 may provide for a flexible system configured to display right eye image data and left eye image data that is customized to counteract a correction of a first corrective optic and a second corrective optic of the corrective lenses 18. The augmented image data for the left eye and the right eye of the occupant 16 may be generated by one or more processors, microprocessors, graphical processing units (GPUs), etc., which may be in communication with and/or incorporated in the display system 10.

In an exemplary embodiment, the display apparatus 24 of the display system 10 may be incorporated in an interior rearview assembly 26. The display apparatus 24 may be mounted or otherwise attached to a vehicle 12 in a variety of locations. For example, the display apparatus 24 may be integrated into a gauge cluster 27, a dashboard 28, a center stack 30 (e.g., infotainment center), or a headliner of the vehicle 12. The display apparatus 24 may be located in other peripheral locations. For example, the display apparatus 24 may be mounted to a visor. The display apparatus 24 may be mounted to other surfaces of a vehicle 12 (e.g. windshield, door panel, or other vehicle components).

Figure 2:
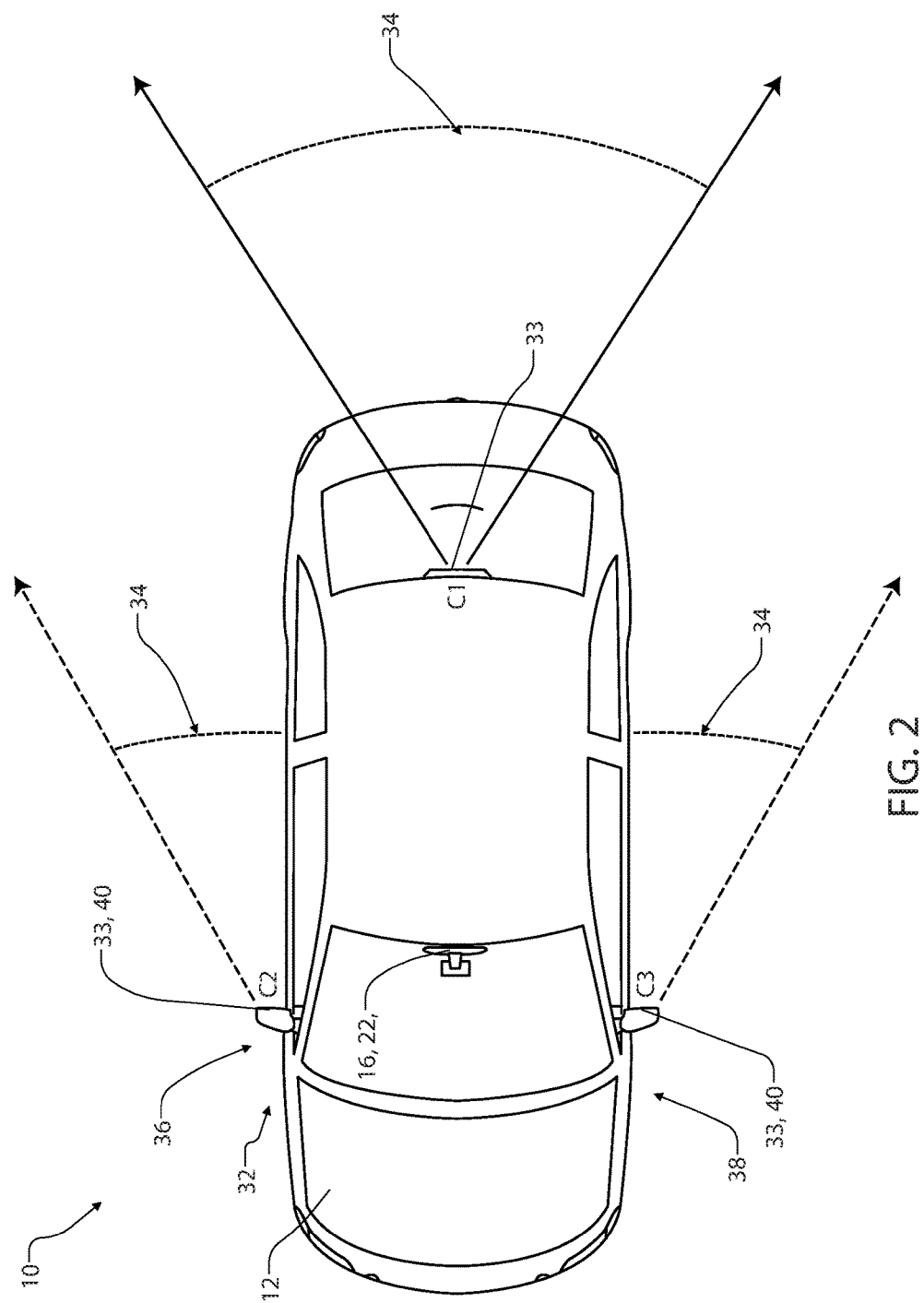
FIG. 2 is an elevational view of a vehicle demonstrating an imaging apparatus of a vehicle.

Referring now to FIG. 2, a diagram of an imaging apparatus 32 of the vehicle 12 is shown. In an exemplary embodiment, a plurality of image sensors 33 of the imaging apparatus 32 may correspond to a first image sensor C1, a second image sensor C2, and a third image sensor C3. Each of the image sensors 33 may have a field of view 34 focusing on an environment proximate the vehicle 12. In the various implementations discussed herein, the image sensors C1-C3 may be implemented to provide views of the environment proximate the vehicle 12 that may be displayed on the display screen 14 or any form of display device.

The image sensors 33 may be arranged in various locations on the vehicle 12. In an exemplary embodiment, the image sensors 33 may be arranged such that each of a plurality of fields of view 34 of the image sensors C1-C3 is configured to capture a significantly different portion of the surrounding environment. Each of the image sensors 33 may comprise any form of device configured to capture image data, for example Charge Coupled Device (CCD) and Complementary Metal Oxide Semiconductor (CMOS) image sensors. Though three image sensors C1, C2, and C3 are discussed in reference to the present implementation, the number of image sensors may vary based on the specifications of the particular image sensors and/or a desired number of fields of view 34 for the display system 10.

The image sensors C1, C2, and C3 are disposed on the vehicle 12 and oriented such that each field of view 34 of the image sensors 33 is directed toward a substantially different region. A first image sensor C1 may be disposed centrally on a rear facing portion of the vehicle 12 proximate a tailgate or similar area of the vehicle 12. In some embodiments, the image sensor C1 may be disposed proximate a rear-bumper and/or a center high mount stop light (CHMSL). A second image sensor C2 and a third image sensor C3 may be disposed on a passenger's side 36 and a driver's side 38 of the vehicle 12, respectively. The second image sensor C2 and the third image sensor C3 may be configured to capture image data corresponding to the environment proximate the side regions of the vehicle 12.

In some implementations, the second image sensor C2 and the third image sensor C3 may be disposed in side mirrors 40 of the vehicle 12. The image sensors C2 and C3, in combination with the first image sensor C1, may be configured to capture image data corresponding to a rearward-directed region relative the forward direction of the vehicle 12. In some embodiments, the image sensors 33 may be configured to capture an increased or decreased viewing angle depending on the particular application. In some embodiments, the image sensors may be configured to capture approximately the entire environment surrounding the vehicle 12.

As discussed further in reference to FIG. 3, the image sensors 33 may be in communication with the image processor configured to process image data from each of the fields of view 34 captured by the image sensors 33. The image processor may be configured to generate augmented image data from the fields of view 34 for each of the right eye and the left eye of the occupant 16. In this configuration, the display system 10 may provide for an enhanced viewing experience that may provide the image data displayed on the display screen 14 to appear focused to the occupant 16 even when viewed through the corrective lenses 18. Though discussed in detail in reference to the interior rearview assembly 26, the display system 10 may be utilized in various portions of the vehicle (e.g. a vehicle console, gage cluster, side mirrors, etc.). As such, the disclosure provides for various embodiments of vehicle displays that may be utilized for a variety of applications.

Referring now to FIG. 3, a block diagram of an image processing method that may be completed by the image processor is shown. The image processor may receive image data from one or more of the image sensors C1, C2, and C3 and encode or process the image data for demonstration on the display screen 14. For example, the first image sensor C1 may provide for a first view (VIEW 1), the second image sensor C2 may provide for a second view (VIEW 2), and the third image sensor C3 may provide for a third view (VIEW 3). The image views may be processed by the image processor, which may comprise each of the views being cropped, enhanced, and/or composited for display on the display screen 14 (42).

The image data received from the image processor may further be processed according to a right counter-correction (44) and a left counter-correction (46). The counter-correction processing of the image data may comprise magnification and/or image tailoring for each eye of the occupant 16. Accordingly, the display system 10 may further be operable to receive visual correction information corresponding to the corrective lenses 18 and/or one or more visual defects (e.g. hyperopia) of the occupant. The visual correction information may be utilized by the image processor to tailor the right eye image data (48) and the left eye image data (50) to counteract the correction of the corrective lenses 18 or farsightedness. In this way, the display apparatus 24 may be configured to display the nearby image data within the passenger compartment 22 having an appearance of being in focus while the occupant 16 wears the corrective lenses 18 that would otherwise distort the appearance of the image data.

The right counter-correction 44 and the left counter-correction 46 may correspond to a process of adapting the image data to compensate for the visual correction information of the occupant. Based on the visual correction information, the image data may be warped or otherwise manipulated to counteract the correction of the corrected lenses 18. The manipulation of the image data may include pairing light-field rays and retinal positions, and normalizing retinal "pixels" of the image data. In this way, based on the specific correction for each of the right eye and the left eye of the occupant 16, the image data may be manipulated to counter-correct for the correction of the corrective lenses 18. Details regarding a correction method for providing a tailored display configured to demonstrate image data that may prevent a need for vision correction is disclosed in the follow documents, each of which are incorporated herein by reference in its entirety: Pamplona et al., "Tailored Displays to Compensate for Visual Aberrations." *ACM Trans. on Graph.* 31(4). Pages 87:1-12; and Huang et al., "Eyeglasses-free Display: Towards Correcting Visual Aberrations with Computational Light Field Displays." *ACM SIGGRAPH* 2014, Vancouver.

Referring now to FIG. 4, a schematic diagram of an image processing method for of the occupant 16 of a vehicle 12 is shown. As discussed herein, the display system 10 may be configured to display augmented image data 70, which may be transformed by the corrective lenses 18 to provide reverted image data 72 to the occupant 16. Viewing reverted image data 72 converted from the augmented image 70 data may provide for the occupant 16 to view the image data displayed on a display screen 14 of the display apparatus 24 as being in focus. For example, the augmented image data 70 may be configured to appear in focus after passing through each of the first corrective lens 18*a* and a second corrective lens 18*b* of the corrective lenses 18. The first corrective lens 18*a* and a second corrective lens 18*b* may bend and transform the augmented image data 70 to the reverted image data 72.

Referring now to FIGS. 4 and 5, in order to provide for independent correction of the augmented image data 70 for the right eye 74 and the left eye 76 of the occupant 16, the display system 10 may be configured to communicate right eye image data 82 (R) to the right eye and left eye image data 84 (L) to the left eye 76. As discussed herein, the display apparatus 24 may correspond to an autosteroscopic display device configured to project the right eye image data 82 to the right eye 74 and the left eye image data 84 to the left eye 76. In this configuration, the display system 10 may communicate the augmented image data 70 to the occupant based on a left eye correction and a right eye correction.

As shown in FIG. 5, the display apparatus 24 is shown in reference to a windshield 90 of the vehicle 12. To provide such functionality, the display apparatus 24 may comprise a display panel 92 corresponding to a pixel array 94 and a lenticular lens 96 formed on the display panel 92. A rear surface of the display screen 14 may face the lenticular lens 96. The display panel 92 may be a variety of display types having the pixel array 94, which may be arranged in rows and columns. For example, the display panel 92 may correspond to a liquid crystal display (LCD), a plasma display, an organic light emitting diode (OLED) display, a field emission display (FED) panel, or various other displays.

The lenticular lens 96 may comprise long cylindrical lens elements 98. The lens elements 98 may be arranged in parallel and be aligned with the columns of the pixel array 94. Accordingly, the lenticular lens 96 may be disposed over the display panel 92. The lenticular lens 96 may separate the right eye image data 82 from the left eye image data 84 based on a location of each pixel relative to the cylindrical elements 98. In this way, the display apparatus 24 may be configured to direct the right eye image data 82 to the first corrective lens 18*a* (e.g. the right eye 74) and the left eye image data 84 to the second corrective lens 18*b* (e.g. the left eye 76).

As discussed herein, the display system 10 may be operable to receive image data corresponding to one or more images of a scene proximate the vehicle 12. The system 10 may apply one or more algorithms or image processing techniques to produce augmented image data 70 configured to reverse the visual effects of the first corrective lens 18*a* and the second corrective lens 18*b* independently. The occupant 16 of the vehicle 12 may view the augmented image data 70 as reverted image data 72 due to the image data being transformed via the corrective lenses 18. As a result, the right eye image data 82 and left eye image data 84 displayed on the display screen 14 may appear to the occupant 16 as though the occupant were viewing the image data on the display screen 14 without the wearing the corrective lenses 18. In this way, the disclosure provides for a system configured to alleviate issues for the occupant 16 (e.g. the operator) in utilizing corrective lenses 18 for viewing far off objects 100 in distant region 20 and viewing the image data on the display screen 14. Put simply, the system 10 may provide for the far off objects 100 in the distant region 20 and the display screen 14 in the passenger compartment 22 to appear in focus to the occupant 16 despite the use of the corrective lenses 18.

Figure 6:
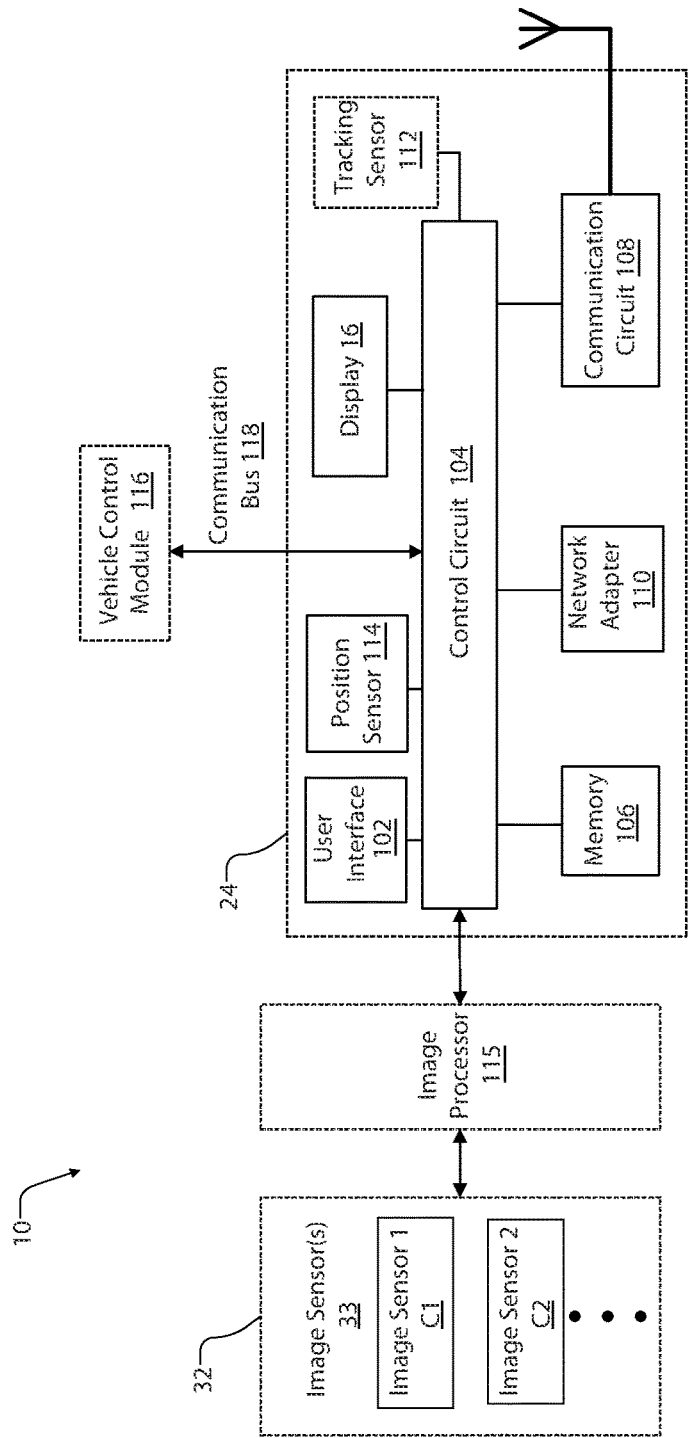
FIG. 6 is a block diagram of a display system in accordance with the disclosure.

Referring now to FIG. 6, a block diagram of the display system 10 is shown. The display system 10 may include a user interface 102 in the form of one or more buttons in communication with a control circuit 104. The user interface 102 may be configured to receive information regarding the corrective lenses 18 and/or a prescription required to counter farsightedness of the occupant 16. In this configuration, the system 10 may be configured to receive and store information configured to counter-correct the effects of the corrective lenses 18 and/or correct a visual defect (e.g. farsightedness). An exemplary embodiment of the display apparatus 24 may incorporate the elements shown in the dashed line box designated as the display apparatus 24. In some embodiments, the user interface 102 may include input devices such as touchscreen displays, switches, microphones, knobs, touch sensor (e.g., projected capacitance sensor resistance based touch sensor, resistive touch sensor, or other touch sensor), proximity sensors (e.g., projected capacitance, infrared, ultrasound, infrared, or other proximity sensor), or other hardware configured to generate an input from a user action.

The display system 10 may comprise the display apparatus 24. The display apparatus 24 may comprise the display panel 92 corresponding to a pixel array 94 and a lenticular lens 96 formed on the display panel 92. A rear surface of the display screen 14 directed away from the occupant 16 may face the lenticular lens 96. The display panel 92 may be a variety of display types having the pixel array 94, which may be arranged in rows and columns. For example, the display panel 92 may correspond to a liquid crystal display (LCD), a plasma display, an organic light emitting diode (OLED) display, a field emission display (FED) panel, or various other displays. The display apparatus 24 may further incorporate a speaker, haptic feedback device (e.g., vibration motor), LEDs, or other hardware component for providing an output.

The control circuit 104 may include various types of control circuitry, digital and/or analog, and may include a microprocessor, microcontroller, application-specific integrated circuit (ASIC), graphics processing unit (GPU), or other circuitry configured to perform various input/output, control, analysis, and other functions to be described herein. In other embodiments, the control circuit 104 may be a system on a chip (SoC) individually or with additional hardware components described herein. The control circuit 104 may further include memory 106 (e.g., random access memory, read only memory, flash memory, hard disk storage, flash memory storage, solid state drive memory, etc.). In further embodiments, the control circuit 104 may function as a controller for one or more hardware components included in the display system 10. For example, the control circuit 104 may function as a controller for a touchscreen display or other operator input device, a controller for a transceiver, transmitter, receiver, or other communication device (e.g., implement a Bluetooth communications protocol).

In some embodiments, the control circuit 104 may be configured to receive inputs from the user interface 102. The inputs may be converted into control signals that may be identified and utilized to output one or more control signals and/or transmit data. In this configuration, the display system 10 may communicate (e.g. send and/or receive signals and/or data) to control various functions of the display or settings or functions of the vehicle 12.

The memory 106 may be used to facilitate the functions of the display system 10 as described herein. Memory 106 may include computer code modules, data, computer instructions, or other information which may be executed by the control circuit 104 or otherwise facilitate the functions of the display system 10 described herein. For example, memory 106 may include encryption codes, pairing information, identification information, a device registry configurations, image augmentation information, occupant specific corrective lens information, etc. The memory 106 and/or the control circuit 104 may facilitate the functions described herein using one or more programming techniques, data manipulation techniques, and/or processing techniques such as using algorithms, routines, lookup tables, arrays, searching, databases, comparisons, instructions, etc.

The display system 10 may further comprise a communication circuit 108. The communication circuit 108 may correspond to a transceiver circuit or transmitter circuit coupled to the control circuit 104. The transceiver circuit may provide for the display system 10 to transmit and/or receive wireless communication signals. The wireless communication signals may be transmitted to or received from a variety of wireless devices (e.g., an original transmitter, home electronic device, mobile communications device, and/or remote device). The communication circuit 108 may be controlled by the control circuit 104. For example, the control circuit 104 may turn on or off the communication circuit 108, the control circuit 104 may send data using the communication circuit 108, format information, an activation signal, control signal, and/or other signal or data for transmission via the communication circuit 108, or otherwise control the communication circuit 108. Inputs from the communication circuit 108 may also be received by the control circuit 104. For example, a prescription vision correction and/or information defining the correction of the corrective lenses 18 may be received by the communication circuit 108 and stored in the memory 106 by the control circuit 104.

In some embodiments, the communication circuit 108 may include additional hardware such as processors, memory, integrated circuits, antennas, etc. The communication circuit 108 may process information prior to transmission or upon reception and prior to passing the information to the control circuit 104. In some embodiments, the communication circuit 108 may be coupled directly to memory 106 (e.g., to store encryption data, retrieve encryption data, etc.). In further embodiments, the communication circuit 108 may include one or more transceivers, transmitters, receivers, etc. For example, the communication circuit 108 may include an optical transceiver, near field communication (NFC) transceiver, etc. In some embodiments, the communication circuit 108 may be implemented as a SoC.

The control circuit 104 may be also coupled to a network adapter 110, receivers, and/or transmitters. In some embodiments, the network adapter 110 may be configured to communicate with the image sensors 33. In some embodiments, the network adapter 110 may be or include a cellular transceiver. In this configuration, the display system 10 may use the network adapter 110 and/or an additional transceiver (e.g., a cellular transceiver) to access the internet, other networks, and/or network hardware. In some embodiments, the display system 10 may access the internet, other networks, and/or network hardware through an intermediate device in communication with the display system 10 such as the mobile device.

In an exemplary embodiment, the network adapter 110 may be configured to send/receive data and/or control signals to a mobile device. The network adapter 110 may communicate via various wireless communication protocols. For example, communication protocols may include but are not limited to Bluetooth™ (e.g., a Bluetooth low energy (BLE), WiFi (IEEE 802.11), Zigbee, cellular, etc.), a wired interface and/or protocol (e.g., Ethernet, universal serial bus (USB), Firewire, etc.), or other communications connection (e.g. infrared, optical, ultrasound, etc.).

In some embodiments, the display system 10 may track a position of the occupant 16 or a viewer (e.g. a position of the eyes of the occupant 16) with the tracking sensor 112. The tracking sensor 112 may be implemented as an ultrasound sensor, an infrared sensor, a camera sensor/imager, a heat detector, etc. In general, the tracking sensor 112 may identify a position of the occupant 16 to generate views of image data (e.g. the augmented image data) from the image sensors 33. The augmented image data may correspond to views that appear to the occupant 16 as though they are in focus even when viewed through the corrective lenses 18 or when viewed without correction for farsightedness. The augmented image data may be communicated separately to the right eye 18a and the left eye 18b to accommodate for a difference in the correction for each eye.

In some embodiments, the display system 10 may comprise a position sensor 114 configured to identify a position or orientation of the display apparatus 24 relative to a forward direction of the vehicle 12. The position sensor 114 may correspond to an electrical or electromechanical sensor (e.g. an encoder, potentiometer, proximity sensor, compass, gyroscope, etc.), and may be configured to identify an angle of the display apparatus 24 or the display screen 14 relative to the forward direction of the vehicle 12. In this way, the image processor 115 may be operable to process the image data to select a plurality of views to generate the image data based on the angle of the display screen 14.

The control circuit 104 may be in communication with a vehicle control module 116 via a communication bus 118 of the vehicle 12. The communication bus 118 may be configured to deliver signals to the control circuit 104 identifying various states of the vehicle 12. For example, the communication bus 118 may be configured to communicate an operating condition of the vehicle (e.g. the ignition is active, a gear selection, a lighting activation or setting, etc.), an ambient light level, a seat occupancy, a door ajar signal, driver/occupant identity or any other information or control signals that may be communicated via the communication bus 118. In this way, the control circuit 104 communicate with the vehicle control module 116 to identify a variety of conditions and/or settings of the vehicle 12.

In some embodiments, the display system 10 may be incorporated display similar to those disclosed in the following references. Examples of display assemblies that may be utilized with the disclosure may include U.S. Pat. No. 6,572,233 "Rearview display mirror," U.S. Pat. No. 8,237,909 entitled "Vehicular rearview mirror assembly including integrated backlighting for a liquid crystal display (LCD),"

U.S. Pat. No. 8,411,245 "Multi-display mirror system and method for expanded view around a vehicle," and U.S. Pat. No. 8,339,526 "Vehicle rearview mirror assembly including a high intensity display," which are incorporated herein by reference in their entirety.

The following references may include various implementations for imager systems providing rearward facing panoramic views and are incorporated herein by reference in their entirety: U.S. Pat. No. 8,237,909 B2, entitled "VEHICLE REARVIEW MIRROR ASSEMBLY INCLUDING INTEGRATED BACKLIGHTING FOR A LIQUID CRYSTAL DISPLAY (LCD), filed Feb. 6, 2009, by John B. Ostreko et al.; and U.S. Pat. No. 8,411,245, entitled "MULTI-DISPLAY MIRROR SYSTEM AND METHOD FOR EXPANDED VIEW AROUND A VEHICLE," filed Sep. 30, 2009, by Ethan J. Lee et al. Though the display system 10 in the various implementations disclosed herein is shown incorporated in a rearview display system, a display may similarly be incorporated in a vehicle forward center console, heads up display, or in any other location that may be visible to an operator of the vehicle 12.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A vehicle display device comprising:
   at least one image sensor configured to capture image data;
   a tracking sensor configured to capture tracking data indicating a position of an occupant;
   an image processor in communication with the image sensor and the tracking sensor, the image processor configured to generate augmented image data from the image data, wherein the augmented image data is configured to counteract a farsightedness of an occupant of the vehicle; and
   a display apparatus in connection with the vehicle and in communication with the image processor, the display apparatus comprising a pixel array aligned with an optic array, wherein the display apparatus is configured to selectively activate pixels of the pixel array based on the position of the occupant communicating the augmented image data independently to each of a right eye and a left eye of the occupant via the optic array.

2. The display system according to claim 1, wherein the augmented image data is configured to counteract a visual correction of at least one corrective lens worn by the occupant.

3. The display system according to claim 2, wherein the visual correction corresponds to a specific prescription of the corrective lens.

4. The display system according to claim 2, wherein the at least one corrective lens comprises a first corrective lens and a second corrective lens, and wherein the augmented image data comprises right image data configured to correct for a first prescription of the first lens and left image data configured to correct for a second prescription of the second lens.

5. The display system according to claim 4, wherein the display apparatus comprises the pixel array and a lenticular lens.

6. The display system according to claim 5, wherein the image processor manipulates the image data by pairing light field rays of the pixels of the pixel array with retinal positions of the occupant.

7. The display system according to claim 5, wherein the right image data and the left image data are communicated to the occupant by selectively activating pixels of the pixel array aligned through the lenticular lens with the right eye and the left eye of the occupant respectively.

8. The display system according to claim 7, wherein the display apparatus is configured to direct the right image data to the right eye and the left image data to the left eye based on the position identified by the tracking sensor.

9. The display system according to claim 1, wherein the display apparatus corresponds to an autostereoscopic display.

10. The display system according to claim 1, wherein the display apparatus corresponds to a rearview display apparatus.

11. A display system for a vehicle comprising:
at least one image sensor configured to capture image data;
an image processor in communication with the image sensor and configured to generate augmented image data from the image data, wherein the augmented image data is configured to counteract a farsightedness of an occupant of the vehicle;
a tracking sensor configured to capture tracking data indicating a position of an occupant;
a display apparatus in connection with the vehicle and in communication with the image processor, the display apparatus comprising a pixel array aligned with an optic device, wherein the display apparatus is configured to selectively activate pixels of the pixel array aligned with the position of the occupant via the optic device communicating the augmented image data to the occupant.

12. The display system according to claim 11, wherein the augmented image data is processed by the image processor providing a perception of a magnification.

13. The display system according to claim 11, wherein the augmented image data is configured to counteract a farsightedness of an operator of the vehicle.

14. The display system according to claim 13, wherein the farsightedness comprises a specific prescription and wherein the augmented image data is manipulated by the processor correcting for the farsightedness.

15. The display system according to claim 14, wherein the image data is converted by the farsightedness of the operator thereby reverting the augmented image data to appear in focus to the operator.

16. The display system according to claim 11, wherein the optic device comprises an optic array configured to communicate the augmented image data as a right image data to the right eye and a left image data to the left eye.

17. The display system according to claim 16, wherein the optic array comprises a lenticular lens configured to project the right image data in a first direction and the left image data in a second direction.

18. A vehicle display device comprising:
at least one image sensor configured to capture image data;
a tracking sensor configured to capture tracking data indicating a position of an occupant;
an image processor in communication with the image sensor and the tracking sensor, the image processor configured to generate augmented image data from the image data, wherein the augmented image data is configured to counteract a farsightedness of an occupant of the vehicle; and
a display apparatus in communication with the image processor, the display apparatus comprising a pixel array and a lenticular lens configured to communicate the augmented image data independently to a right eye of the occupant as right image data and a left eye of the occupant as left image data, wherein the display is configured to selectively activate pixels of the pixel array aligned through the lenticular lens with the right eye and the left eye of the occupant respectively based on the position of the occupant.

19. The display system according to claim 18, wherein the augmented image data is configured to counteract a visual correction of a corrective lens of the occupant comprising a specific prescription.

20. The display system according to claim 18, wherein the image processor manipulates the image data by pairing light field rays of the pixels of the pixel array with retinal positions of the occupant, wherein the retinal positions are identified by the tracking sensor.

* * * * *